(12) United States Patent
Jung

(10) Patent No.: US 12,233,468 B2
(45) Date of Patent: Feb. 25, 2025

(54) INDEXABLE CUTTING INSERT

(71) Applicant: WALTER AG, Tubingen (DE)

(72) Inventor: Alexander Jung, Tubingen (DE)

(73) Assignee: Walter AG, Tubingen (DE)

( * ) Notice: Subject to any disclaimer, the term of this patent is extended or adjusted under 35 U.S.C. 154(b) by 453 days.

(21) Appl. No.: 17/628,742

(22) PCT Filed: Jun. 24, 2020

(86) PCT No.: PCT/EP2020/067570
§ 371 (c)(1),
(2) Date: Jan. 20, 2022

(87) PCT Pub. No.: WO2021/013453
PCT Pub. Date: Jan. 28, 2021

(65) Prior Publication Data
US 2022/0266358 A1    Aug. 25, 2022

(30) Foreign Application Priority Data
Jul. 24, 2019    (EP) ..................... 19188186

(51) Int. Cl.
*B23C 5/20*    (2006.01)
*B23C 5/10*    (2006.01)

(52) U.S. Cl.
CPC ............. *B23C 5/202* (2013.01); *B23C 5/109* (2013.01); *B23C 2200/0477* (2013.01); *B23C 2200/208* (2013.01); *B23C 2210/168* (2013.01)

(58) Field of Classification Search
CPC ............ B23C 5/202; B23C 2200/0477; B23C 2200/208; B23C 5/109; B23C 2210/168;
(Continued)

(56) References Cited

U.S. PATENT DOCUMENTS 5,876,160 A    3/1999    Johnson
5,904,450 A    5/1999    Satran et al.
(Continued)

FOREIGN PATENT DOCUMENTS

CN    103128350 A    6/2013
CN    203610753 U    5/2014
(Continued)

*Primary Examiner* — Sara Addisu
(74) *Attorney, Agent, or Firm* — Corinne R. Gorski

(57) ABSTRACT

An indexable cutting insert, arranged for being mounted in an insert seat of a tool body of a shoulder milling tool, includes a triangular top surface, a triangular bottom surface, and three circumferential surfaces extending between the top and bottom surface. On each side of the cutting insert an individual one of the three circumferential surfaces extends along an edge of the triangular top surface and along an edge of the triangular bottom surface. The cutting insert includes at each of the top and bottom surfaces three cutting corners, three main cutting edges and three minor cutting edges. Each cutting corner connects a main cutting edge and a minor cutting edge. Each of the cutting corners, each of the main cutting edges and each of the minor cutting edges are provided at an intersection between the top surface or the bottom surface and one of the circumferential surface.

10 Claims, 4 Drawing Sheets

(58) Field of Classification Search
CPC .. B23C 5/10; B23C 5/20; B23C 5/205; B23C 2200/287
See application file for complete search history.

(56) References Cited

U.S. PATENT DOCUMENTS

| | | | | |
|---|---|---|---|---|
| 6,146,065 | A * | 11/2000 | Isaksson | B23B 5/12 |
| | | | | 407/113 |
| 2003/0180103 | A1* | 9/2003 | Nagaya | B23C 5/2243 |
| | | | | 407/34 |
| 2007/0071559 | A1* | 3/2007 | Koskinen | B23C 5/202 |
| | | | | 407/34 |
| 2013/0004251 | A1 | 1/2013 | Hausman et al. | |
| 2013/0170915 | A1* | 7/2013 | Saji | B23B 51/02 |
| | | | | 407/113 |
| 2013/0251464 | A1* | 9/2013 | Hecht | B23C 5/2213 |
| | | | | 407/113 |
| 2014/0010605 | A1* | 1/2014 | Smilovici | B23C 5/06 |
| | | | | 407/42 |
| 2014/0334890 | A1* | 11/2014 | Takahashi | B23C 5/205 |
| | | | | 407/40 |
| 2015/0202697 | A1* | 7/2015 | Shiota | B23C 5/109 |
| | | | | 407/42 |
| 2016/0082528 | A1* | 3/2016 | Ballas | B23C 5/06 |
| | | | | 407/48 |
| 2016/0256941 | A1* | 9/2016 | Brunetto | B23C 5/06 |
| 2016/0375506 | A1* | 12/2016 | Koike | B23C 5/2213 |
| | | | | 407/48 |
| 2017/0014918 | A1* | 1/2017 | Aso | B23C 5/109 |
| 2017/0014919 | A1* | 1/2017 | Kister | B23C 5/06 |
| 2017/0113286 | A1* | 4/2017 | Nam | B23C 5/202 |
| 2018/0043444 | A1* | 2/2018 | Saji | B23C 5/202 |
| 2019/0314906 | A1* | 10/2019 | Mihalik | B23C 5/109 |

FOREIGN PATENT DOCUMENTS

| | | | | | |
|---|---|---|---|---|---|
| CN | 104507608 | A | | 4/2015 | |
| CN | 109843489 | A | | 6/2019 | |
| DE | 102011056422 | A1 | * | 6/2013 | ............ B23C 5/08 |
| GB | 1171671 | A | | 11/1969 | |
| WO | 2000513659 | A | | 2/1998 | |
| WO | WO-2010137762 | A1 | * | 12/2010 | ............ B23C 5/109 |
| WO | 2013153547 | A1 | | 10/2013 | |
| WO | WO-2014021314 | A1 | * | 2/2014 | ............ B23C 5/06 |
| WO | 2015030421 | A1 | | 3/2015 | |
| WO | WO-2015080168 | A1 | * | 6/2015 | ............ B23C 5/109 |
| WO | WO-2015129770 | A1 | * | 9/2015 | ............ B23C 5/109 |

* cited by examiner

INDEXABLE CUTTING INSERT

RELATED APPLICATION DATA

This application is a § 371 National Stage Application of PCT International Application No. PCT/EP2020/067570 filed Jun. 24, 2020 claiming priority to EP 19188186.1 filed Jul. 24, 2019.

TECHNICAL FIELD

The present invention relates to an indexable cutting insert for mounting in an insert seat of a tool body of a shoulder milling tool, the cutting insert being generally defined by a triangular top surface, a triangular bottom surface, and three circumferential surfaces extending between the top surface and the bottom surface, wherein on each side of the cutting insert an individual one of the three circumferential surfaces extends along an edge of the triangular top surface and along an edge of the triangular bottom surface, the cutting insert comprising at each of the top surface and the bottom surface three cutting corners, three main cutting edges and three minor cutting edges, wherein each cutting corner connects a main cutting edge and a minor cutting edge, wherein each of the cutting corners, each of the main cutting edges and each of the minor cutting edges are provided at an intersection between the top surface or the bottom surface and one of the circumferential surfaces.

BACKGROUND

Many machine parts have a design, which requires machining of a metal workpiece to form a shoulder arranged at a defined angle with respect to a wall surface. For so-called shoulder milling, indexable cutting inserts of various types are known, for example triangular, double-sided cutting inserts of the type mentioned above. A problem with some such known cutting inserts is that it can be difficult to produce machine parts that comply with tight tolerances.

SUMMARY

It is an object of the present invention to alleviate the above-mentioned problem and to provide an indexable cutting insert with which the ability to produce machine parts that comply with tight tolerances is improved.

According to a first aspect of the present invention, at least one of the above objects is addressed by an indexable cutting insert for mounting in an insert seat of a tool body of a shoulder milling tool, the cutting insert being generally defined by a triangular top surface, a triangular bottom surface, and three circumferential surfaces extending between the top surface and the bottom surface, wherein on each side of the cutting insert an individual one of the three circumferential surfaces extends along an edge of the triangular top surface and along an edge of the triangular bottom surface, the cutting insert comprising at each of the top surface and the bottom surface three cutting corners, three main cutting edges and three minor cutting edges, wherein each cutting corner connects a main cutting edge and a minor cutting edge, wherein each of the cutting corners, each of the main cutting edges and each of the minor cutting edges are provided at an intersection between the top surface or the bottom surface and one of the circumferential surfaces, and wherein each of the circumferential surfaces comprises a planar contact surface, which planar contact surface is delimited by a main cutting edge at the top surface and by a main cutting edge at the bottom surface.

The present invention provides a triangular indexable cutting insert, wherein the indexable cutting insert has six sets of cutting edges. The six sets of cutting edges, after indexing and flipping of the cutting insert, are usable one after the other such that the overall tool life is six times the lifetime of a cutting insert with a single set of cutting edges. Each set of cutting edges comprises a main cutting edge for milling a wall surface, a minor cutting edge for milling a bottom surface and a cutting corner for milling the corner between the wall surface and the bottom surface of the workpiece to provide a shoulder therein. The cutting corner connects the main cutting edge and the minor cutting edge.

Due to the inventive planar contact surfaces on each of the sides of the cutting insert, which contact surfaces each is delimited by a main cutting edge at a top surface and a main cutting edge at a bottom surface, the indexable cutting insert can be held firmly in an insert seat and a stable connection between the cutting insert and a cutting tool body can be provided. Another advantage is enhanced precision in the mounting position of the cutting insert in an insert seat. Thus, due to the cutting insert being less prone to vibrations and due to exact positioning, ma-chine parts can be produced with tighter tolerances.

Advantageously, the inventive contact surfaces do not interfere with other design conditions of the cutting insert so that the inventive cutting insert provides enhanced position precision and stability in addition.

At an intersection of each of the side surfaces and the top surface, a single main cutting edge, a single minor cutting edge and two cutting corners are provided. Equally, at an intersection of each of the side surfaces and the bottom surface a single main cutting edge, a single minor cutting edge and two cutting corners are provided.

In an embodiment of the present invention, a section of the top surface and a section of the bottom surface are in general parallel. Furthermore, the cutting insert comprises a mid plane located midway between the top surface and the bottom surface. The mid plane extends parallel to those parts of the top surface and the bottom surface, which are parallel to each other.

In an embodiment, each of the contact surfaces is perpendicular to the mid plane. Thus, in this embodiment the cutting insert, with respect to the main cutting edges, is a negative cutting insert.

In an embodiment, each of the minor cutting edges is straight.

In an embodiment of the present invention, the cutting insert comprises a mid plane located midway between the top surface and the bottom surface, wherein the cutting insert comprises at each of the top surface and the bottom surface three transition edges, which transition edges are provided at an intersection between the top surface or the bottom surface and one of the circumferential surfaces, wherein each transition edge connects a main cutting edge with a minor cutting edge, and, when the main cutting edges and the transition edges are projected onto the mid plane, each transition edge forms an angle with the main cutting edge, to which main cutting edge the transition edge is connected with, wherein, when projected onto the mid plane, each of the main cutting edges is straight and has a total length, wherein the total length is between the cutting corner and the transition edge, to which cutting corner and transition edge the main cutting edge is connected with, and wherein each of the contact surfaces extends along at least two thirds of the total length of the main cutting edges, which main cutting edges delimit the respective contact surface at the top surface and at the bottom surface.

In an embodiment, each of the contact surfaces extends along at least two thirds of the total length of the main cutting edges, which main cutting edges delimit the respective contact surface. In an embodiment, each of the contact surfaces extends along the entire total length of the main cutting edges. By increasing the distance along which a contact surface extends along the main cutting edges the area of the planar contact surface is increased.

In an embodiment of the present invention, each of the planar contact surfaces extends from the cutting corner, which connects the main cutting edge at the top surface to a minor cutting edge at another circumferential surface, to the cutting corner, which connects the main cutting edge at the bottom surface to a minor cutting edge at another circumferential surface. This design leads to a maximized area of each of the planar contact surfaces in a diagonal direction from the cutting corner at the top surface to the cutting corner at the bottom surface.

In an embodiment of the present invention, in a first circumferential direction, each of the contact surfaces is at least partly delimited by a first transition surface, and, in a second circumferential direction, at least partly delimited by a second transition surface. The transition surfaces are part of the circumferential surface. Each transition edge is provided at an intersection between the first transition surface and the top surface or at an intersection between the second transition surface and the bottom surface. Each of the transition surfaces connects the contact surface to a minor clearance surface of a minor cutting edge.

In an embodiment, an extension of the contact surface in a circumferential direction in the mid plane is smaller than an extension of the contact surface along each of the main cutting edges.

In an embodiment of the present invention, the top surface and the bottom surface have a common axis of rotational symmetry, wherein each of the circumferential surfaces comprises two minor clearance surfaces, wherein a first of the two minor clearance surfaces intersects the top surface at a minor cutting edge and a second of the two minor clearance surfaces intersects the bottom surface at a minor cutting edge, and wherein each of the minor clearance surfaces starting from the minor cutting edge is inclined towards the axis of rotational symmetry. Expressed in other words, each of the minor clearance surfaces in its extension from the minor cutting edge towards the mid-plane is inclined inwardly towards the axis of rotational symmetry. Thus, as seen in a cross section through a minor clearance surface and comprising the axis of rotational symmetry, an arbitrary point on the minor clearance surface close to the minor cutting edge is distanced further from the axis of rotational symmetry than an arbitrary point on the minor clearance surface close to the mid-plane.

According to this embodiment, the cutting insert is positive with respect to each of the minor cutting edges. A positive insert at the minor cutting edges enables inclined plunging with a cutting tool comprising a tool body equipped with at least one indexable cutting insert according to this embodiment. Furthermore, the inclined minor clearance surface avoids collision between the cutting insert and a workpiece while simultaneously maximizing the area of the planar contact surfaces.

In an embodiment of the present invention, each of the minor clearance surfaces is a planar surface.

In an embodiment of the present invention, each of the triangular top surface and the triangular bottom surface have a threefold symmetry. However, in an embodiment, the top surface and the bottom surface are provided such that the angular positions of the cutting corners on the top surface relative to the angular positions of the cutting corners on the bottom surface are twisted with respect to each other. Still, in this embodiment the top surface and the bottom surface have a common axis of rotational symmetry. A twisted positioning of the cutting corners of the top and bottom surfaces allows to provide a positive cutting insert with respect to the minor cutting edges.

In an embodiment of the present invention, each of the minor clearance surfaces extends from the minor cutting edge to the mid-plane, which mid-plane is located midway between the top surface and the bottom surface. An extension of the minor clearance surface from the respective minor cutting edge to the mid-plane improves the clearance of the minor cutting edge. In an embodiment each of the minor clearance surfaces ends at the mid plane.

In an embodiment of the present invention, the top surface comprises a planar top support surface and the bottom surface comprises a planar bottom support surface. Providing planar support surfaces on the top surface and the bottom surface in addition to the planar contact surfaces on the circumferential surfaces enhances the mechanical positioning stability and/or positioning precision of the cutting insert when mounted in an insert seat of the tool body.

In an embodiment, each of the minor cutting edges at the top surface projects above the top support surface over an entire length of the minor cutting edge, wherein each of the minor cutting edges at the bottom surface projects above the bottom support surface over an entire length of the minor cutting edge, wherein each of the main cutting edges at the top surface at least partially projects above the top support surface, wherein each of the main cutting edge at the top surface is inclined from an adjacent cutting corner towards the top support surface, which adjacent cutting corner connects the main cutting edge to the minor cutting edge, wherein each of the main cutting edges at the bottom surface at least partly projects above the bottom support surface, and wherein each of the main cutting edges at the bottom surface is inclined from the adjacent cutting corner towards the bottom support surface, which adjacent cutting corner connects the main cutting edge to the minor cutting edge. Expressed in other words, the minor cutting edges, along their entire extension, are raised above the respective top surface or bottom surface, and, at least a part of each main cutting edge is raised above the respective top surface or bottom surface. By arranging the cutting edges above the respective support surface, the areas of the planar support surfaces on the top surface and the bottom surface are increased.

In an embodiment of the present disclosure, the top support surface and the bottom support surface are parallel.

In an embodiment of the present invention, wherein each of the main cutting edges is at least partly raised above the respective planar support surface, the main cutting edge and the respective planar support surface, i.e. the top support surface or the bottom support surface, form an angle in a range from 5° to 15° or in a range from 8° to 12°. The angle is measured in a plane perpendicular to the respective contact surface, or in other words, between the cutting edge and a line perpendicular to a respective support surface normal.

The main cutting edge forming an angle with respect to the top support surface or to the bottom support surface enables mounting of the cutting insert at the tool body such that the main cutting edge provides a positive effective axial angle.

In an embodiment of the present invention, the top surface and the bottom surface each comprise main chip surfaces and minor chip surfaces, wherein each main cutting edge delimits a main chip surface and each minor cutting edge delimits a minor chip surface, wherein each main chip surface and each minor chip surface forms an angle in a range from 0° to 45° with the respective support surface, i.e. the top support surface or the bottom support surface, and wherein each main chip surface rises in a direction towards the main cutting edge and each minor chip surface rises in a direction towards the minor cutting edge. This design of the chip surfaces strengthens the cutting edges by increasing the wedge angle of the respective cutting edge delimiting the chip surface.

In an embodiment of the present invention, the angle between each of the minor chip surfaces and the respective top support surface or bottom support surface is constant.

In an embodiment of the present invention, the angle between each of the main chip surfaces and the respective top support surface or bottom support surface increases or decreases along the main cutting edge. In an embodiment, the angle between the main chip surface and the respective support surface, i.e. top support surface or the bottom support surface, is constant along the main cutting edge.

In an embodiment, wherein a minor chip surface is inclined with respect to the respective support surface or wherein the minor chip surface is parallel to the respective support surface, and wherein the minor clearance surface is inclined from the minor cutting edge towards the axis of rotational symmetry, the inclination of the minor clearance surface provides the minor cutting edge with a positive design.

In an embodiment of the invention, each of the minor cutting edges is parallel to the top support surface.

In an embodiment of the present invention, each pair of a main cutting edge and a minor cutting edge, wherein the main cutting edge and the minor cutting edge are connected by a cutting corner, when projected into a plane parallel to the top support surface, includes an angle in a range from 85° to 95° or from 89° to 91°. An angle in the claimed ranges is considered approximately perpendicular. When looking at a cutting insert according to this embodiment, an operator will be aware that the cutting insert is suitable for shoulder milling providing a 90° angle between a wall surface and a bottom surface of a workpiece.

In an embodiment, a triangular cutting insert according to the present invention has main cutting edges and minor cutting edges, wherein each of the main cutting edges have identical length, wherein each of the minor cutting edges have an identical length, and wherein the length of the main cutting edges is at least twice the length of the minor cutting edges. In an embodiment, the length of the main cutting edges is at least 3 times or at least 4 times the length of the minor cutting edges. When compared to a cutting insert, wherein the main cutting edge and the minor cutting edge have identical length or almost identical length less material is needed to provide the same cutting depth.

At least one of the above objects is solved by a shoulder milling tool comprising a tool body, which tool body includes a plurality of insert seats, and a plurality of indexable cutting inserts according to any one of the embodiments as they have been discussed above, wherein the cutting inserts are mounted on the insert seats.

BRIEF DESCRIPTION OF THE FIGURES

Further advantages, features and applications of the present disclosure will become apparent from the following description of embodiments and the attached figures. The foregoing as well as the following detailed description of embodiments of the present disclosure will be better understood when read in conjunction with the attached figures. It should be understood that the depicted embodiments are not limited to the precise arrangements and instrumentalities shown. Unless otherwise indicated, like reference numerals in different figures refer to like or corresponding parts.

DETAILED DESCRIPTION

Figure 1:
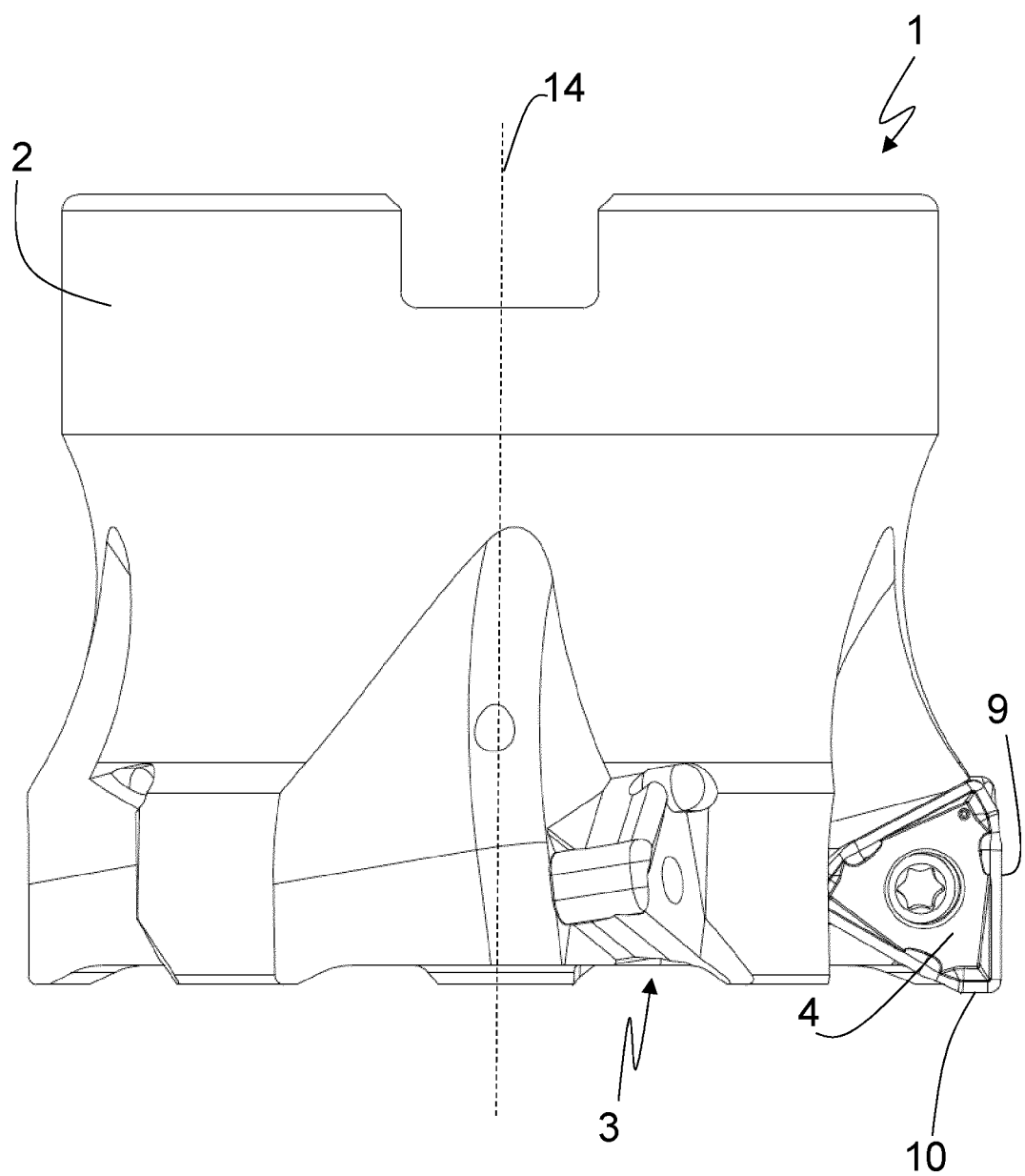
FIG. 1 is a side view of a shoulder milling tool comprising an indexable cutting insert according to an embodiment of the present invention.

The shoulder milling tool of FIG. 1 is designed for milling a shoulder in a workpiece (not shown), which shoulder has a 90° angle between a wall surface and a bottom surface machined in the workpiece.

The shoulder milling tool 1 comprises a tool body 2, which tool body includes a plurality of insert seats 3 and, when operative, a plurality of indexable cutting inserts 4 mounted in the insert seats 3. In FIG. 1, only a single indexable cutting insert 4 is depicted in an insert seat 3 while the remaining insert seats 3 are depicted without cutting inserts 4.

Figure 2:
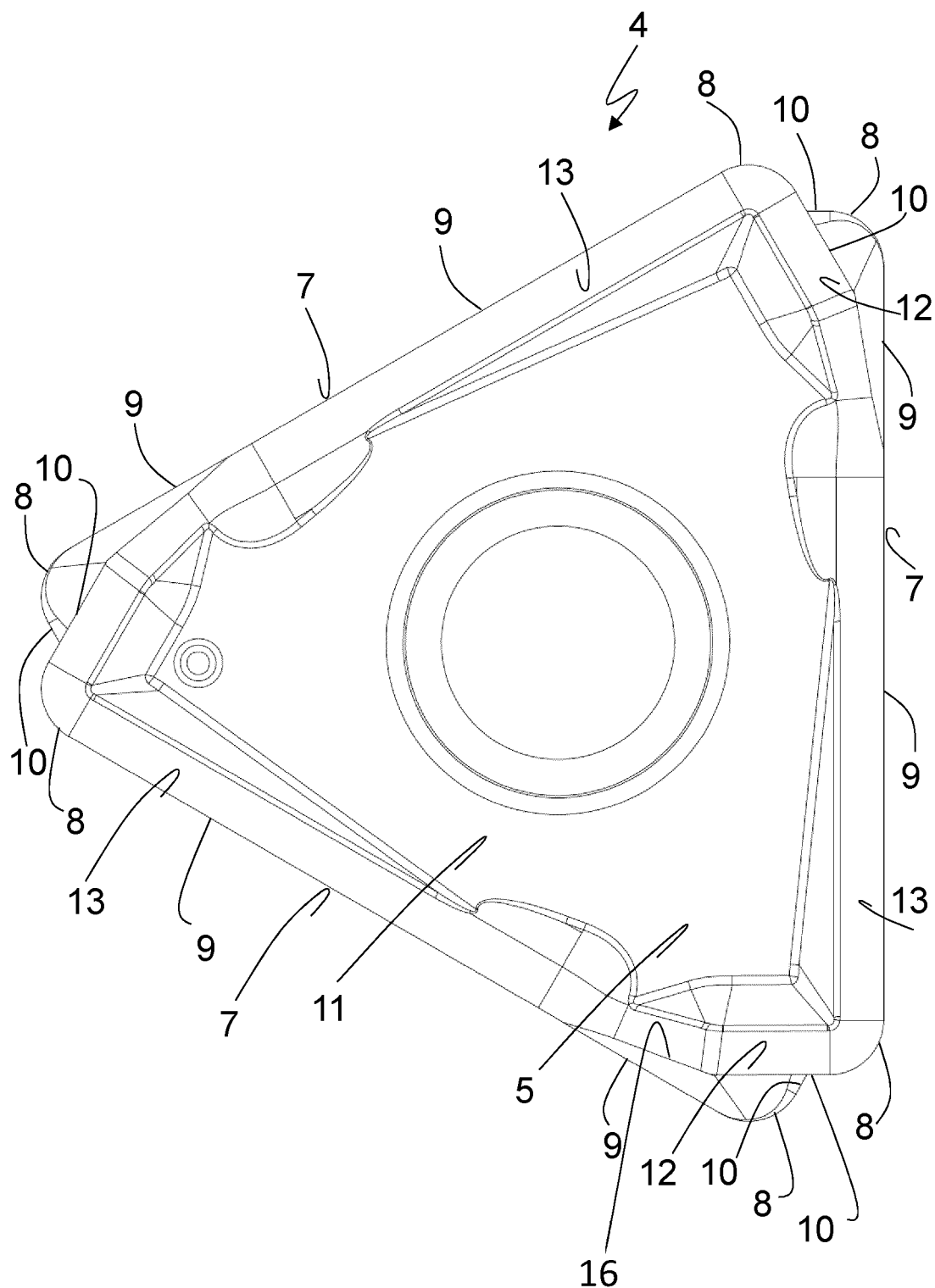
FIG. 2 is a top view of the indexable cutting insert of FIG. 1.

Each of the cutting inserts 4 has a triangular basic shape. The cutting inserts 4 have identical top and bottom surfaces 5, 6 such that a bottom view of the cutting insert 4 would be the same as the top view of FIG. 2. Each feature explained with respect to the top surface 5 below could alternatively be described with respect to the bottom surface 6, too.

The top and bottom surfaces 5, 6 have a threefold symmetry each. However, the triangles defined by the top and bottom surfaces 5, 6 are twisted with respect to each other such that the angular positions of the corners of the top triangle are different from the angular positions of the corners of the bottom triangle. The triangular top surface 5 and the triangular bottom surface 6 are connected by three circumferential surfaces 7. Each of the circumferential surfaces 7 extends along a single side of the top surface 5 and along a single side of the bottom surface 6.

Each of the top surface 5 and the bottom surface 6 comprises three sets of cutting edges, wherein each set of cutting edges is formed by a main cutting edge 9, a minor cutting edge 10 and a cutting corner 8 connecting the main cutting edge 9 and the minor cutting edge 10. Thus, the cutting insert 4 has six sets of cutting edges altogether. Each of the cutting corners 8 and cutting edges 9, 10 is provided at an intersection between either the top surface 5 or the bottom surface 6 and one of the three circumferential surfaces 7.

The top surface 5 comprises a planar top support surface 11, wherein each of the minor cutting edges 10 along its entire extension is raised above a level defined by the planar support surface 11. Due to the cutting corners 8 connecting the raised minor cutting edges 10 to the main cutting edges 9, the main cutting edges 9 are at least partly raised above the planar support surface 11. However, the main cutting edges 9, starting from the cutting corner 8, drop down to a level even below the top support surface 11. This inclination of the main cutting edge 9 enables mounting of the insert 4 at the tool body 2 with a positive effective axial angle.

Due to the raised geometry, each of the minor cutting edges 10 comprises a minor chip surface 12, which is also raised above the level defined by the planar support surface 11. Each of the main cutting edges 9 comprises a main chip surface 13, which is partly raised above the level defined by the planar support surface 11. The main chip surfaces 13 and the minor chip surfaces 12 are inclined with respect to the support surface 11 such that the main cutting edges 9 and the minor cutting edges 10 have a positive wedge angle.

When the cutting insert 4 is mounted in an insert seat 3 of the tool body 2 of FIG. 1, one set of cutting edges comprising a cutting corner 8 and cutting edges 9, 10 is active. The active minor cutting edge 10 is perpendicular to an axis of rotation 14 of the tool body 2. When projected into a plane, which plane is parallel to and comprises the axis of rotation and the minor cutting edge 10, the active main cutting edge 9, which is connected to the active minor cutting edge 10 by a cutting corner 8, is perpendicular to the active minor cutting edge 10.

Figure 3:
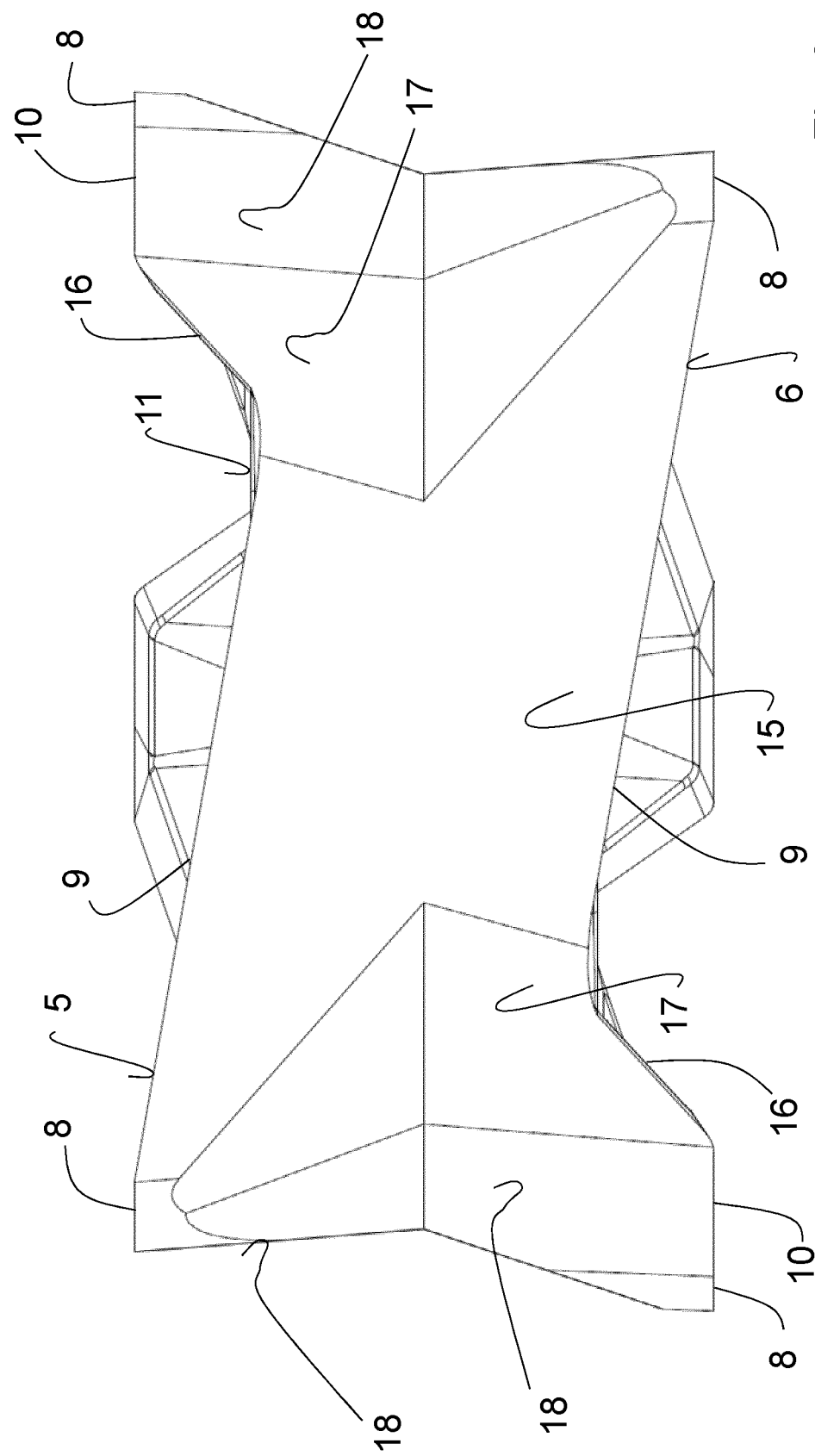
FIG. 3 is a side view of the indexable cutting insert of FIGS. 1 and 2.
Figure 4:
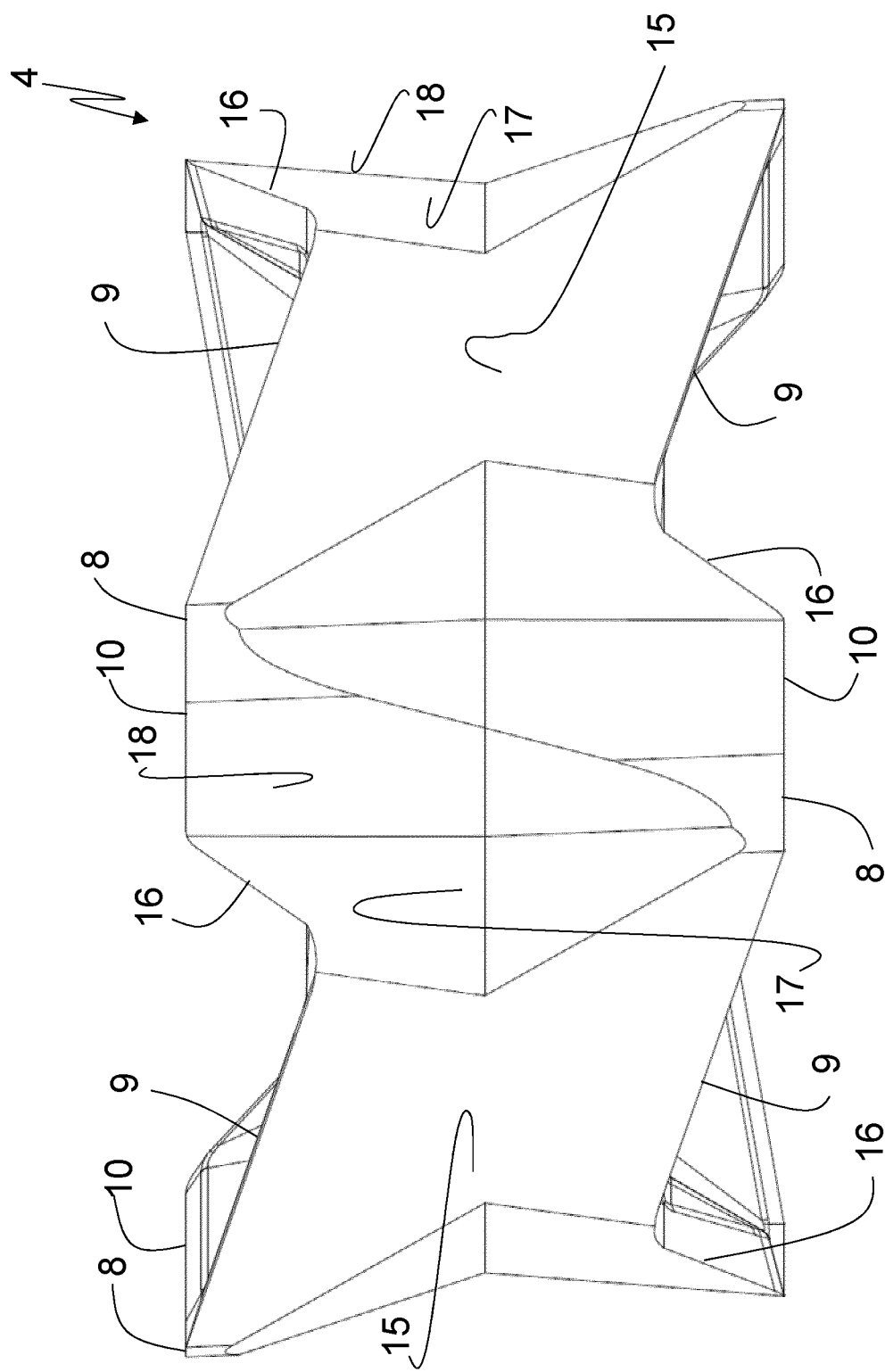
FIG. 4 is a side view to the indexable cutting insert of FIGS. 1 to 3 rotated by 30° when compared to the side view of FIG. 3.

The viewing direction of the side view of FIG. 3 is perpendicular to the main cutting edges 9 at the top and bottom surfaces, respectively. Each of the circumferential surfaces 7 has a number of surface sections.

Centrally, a single planar contact surface 15 is provided on each circumferential surface 7. Each of the planar contact surfaces 15 is delimited by a main cutting edge 9 at the top surface 5 and a main cutting edge 9 at the bottom surface 6. Furthermore, each of the planar contact surfaces 15 in a diagonal direction extends from a cutting corner 8 at the top surface 5 to a cutting corner 8 at the bottom surface 6.

From the side view of FIG. 3 it is apparent that each main cutting edge 9 of a first set of cutting edges comprising a corner 8 and cutting edges 9, 10 is connected to the minor cutting edge 10 of the "next" set by a transition edge 16. Thus, each of the top surface and the bottom surface 5, 6 comprises three transition edges 16. The transition edge 16 terminates the main cutting edge 9 at one end thereof. When projected into the mid plane, the transition edge 16 forms an angle with the main cutting edge 9.

Due to the minor cutting edge 10 and the main cutting edges 9 being at least partially raised above the level defined the support surface 11, a transition edge 16 connecting a main cutting edge 9 to the next minor cutting edge 10 at the same circumferential surface 7 rises from a level below the support surface 11 to the level defined by the minor cutting edges 10.

The contact surface 15 is perpendicular to both the support surfaces 11 on the top surface 5 and bottom surface 6. Thus, the contact surface 15 is perpendicular to a mid plane located midway between the top surface and the bottom surface. The contact surface 15 forms the clearance surface of the main cutting edges 9. Consequently, the cutting insert of FIGS. 1 to 4 is a negative cutting insert with respect to the main cutting edges 9.

At the mid plane, each of the contact surfaces 15 has a circumferential extension which is smaller than the length of the contact surfaces 15 at and along the main cutting edges 9 delimiting the contact surface 15.

The contact surface 15, in a longitudinal, circumferential direction on each side thereof, is separated by a transition surface section 17 from a minor clearance surface 18 associated with the minor cutting edge 10. Each of the minor clearance surfaces 18, starting from the respective minor cutting edge 10, is in its extension towards the mid-plane inclined such that the cutting insert 4 is a positive insert with respect to the minor cutting edges 10.

Each of the main cutting edges 9 has an identical total length and each of the minor cutting edges 10 has an identical total length. When projected into the mid plane, the total lengths of each of the main cutting edges is about 5-times the total lengths of each of the minor cutting edges 10. Thus, a circle inscribed into the triangle will only touch each sides of the triangle once. Due to the chosen geometry, the inscribed circle will touch each of the sides at a main cutting edge 9.

In the embodiment of FIGS. 1 to 4 each of the main and minor cutting edges 9, 10 is straight.

The complex geometry of the cutting insert 4 described above, provides a cutting insert 4 which is negative at the main cutting edges 9 and positive at the minor cutting edges 10. The geometry chosen allows for a large area for the contact surfaces 15 on the circumferential surfaces 7 enhancing the positioning stability of the insert 4 when mounted in the insert seat 3 of the tool body 2. Furthermore, by raising the cutting edges 9, 10 and cutting corners 8 above the level of the support surface 11, the area of the support surfaces 11 is increased further, which in turn also enhances the positioning stability of the insert 4 when mounted in the insert seat 3.

It is noted that the features described in connection with one embodiment can also be used in other embodiments as readily understandable by a person skilled in the art.

While the disclosure has been described in detail and with reference to the Figures, the description is only an example is not considered to restrict the scope of protection as it is defined by the claims.

In the claims the word "comprising" does not exclude other elements or steps and the undefined article "a" does not exclude a plurality. The mere fact that some features have been claimed in different claims does not exclude their combination. Reference numbers in the claims are not considered to restrict the scope of protection.

The invention claimed is:

1. An indexable cutting insert arranged for mounting in an insert seat of a tool body of a shoulder milling tool, the cutting insert comprising:
   a triangular top surface, a triangular bottom surface, and three circumferential surfaces extending between the top surface and the bottom surface, wherein on each side of the cutting insert an individual one of the three circumferential surfaces extends along an edge of the triangular top surface and along an edge of the triangular bottom surface; and
   at each of the top surface and the bottom surface three cutting corners, three main cutting edges and three minor cutting edges, wherein each cutting corner connects a main cutting edge and a minor cutting edge, wherein each of the cutting corners, each of the main cutting edges and each of the minor cutting edges are provided at an intersection between the top surface or the bottom surface and one of the circumferential surfaces, wherein each of the circumferential surfaces includes a planar contact surface, the planar contact surface being delimited by a main cutting edge at the top surface and by a main cutting edge at the bottom surface, wherein the top surface and the bottom surface have a common axis of rotational symmetry, wherein each of the circumferential surfaces has two minor clearance surfaces, wherein a first of the two minor clearance surfaces intersects the top surface at a minor cutting edge and a second of the two minor clearance surfaces intersects the bottom surface at a minor cutting edge, and wherein each of the minor clearance surfaces starting from the minor cutting edge is inclined towards the axis of rotational symmetry.

2. The indexable cutting insert according to claim 1, further comprising a mid plane located midway between the top surface and the bottom surface, and at each of the top surface and the bottom surface three transition edges, the transition edges being provided at an intersection between the top surface or the bottom surface and one of the circumferential surfaces, wherein each transition edge connects a main cutting edge with a minor cutting edge, wherein when the main cutting edges and the transition edges are projected onto the mid plane, each transition edge forms an angle with the main cutting edge, to which main cutting edge the transition edge is connected with, wherein, when projected onto the mid plane, each of the main cutting edges is straight and has a total length, wherein the total length is between the cutting corner and the transition edge, to which cutting corner and transition edge the main cutting edge is connected with, and wherein each of the contact surfaces extends along at least two thirds of the total length of the main cutting edges, the main cutting edges delimiting a respective contact surface at the top surface and at the bottom surface.

3. The indexable cutting insert according to claim 2, wherein each of the contact surfaces extends along the entire total length of the main cutting edges.

4. The indexable cutting insert according to claim 1, wherein each of the minor clearance surfaces extends from the minor cutting edge to a mid plane, the mid plane being located midway between the top surface and the bottom surface.

5. The indexable cutting insert according claim 1, wherein the top surface includes a planar top support surface and wherein the bottom surface includes a planar bottom support surface, wherein each of the minor cutting edges at the top surface projects above the top support surface over an entire length of the minor cutting edge, wherein each of the minor cutting edges at the bottom surface projects above the bottom support surface over an entire length of the minor cutting edge, wherein each of the main cutting edges at the top surface at least partly projects above the top support surface, wherein each of the main cutting edges at the top surface is inclined from an adjacent cutting corner towards the top support surface, which adjacent cutting corner connects the main cutting edge to the minor cutting edge, wherein each of the main cutting edges at the bottom surface at least partly projects above the bottom support surface, and wherein the each of the main cutting edges at the bottom surface is inclined from the adjacent cutting corner towards the bottom support surface, which adjacent cutting corner connects the main cutting edge to the minor cutting edge.

6. The indexable cutting insert according to claim 5, wherein the top surface and the bottom surface each include main chip surfaces and minor chip surfaces, wherein each main cutting edge delimits a main chip surface and each minor cutting edge delimits a minor chip surface, wherein each main chip surface and each minor chip surface form an angle in a range from 0° to 45° with the top support surface and with the bottom support surface, respectively, and wherein each main chip surface rises in a direction towards the main cutting edge and each minor chip surface rises in a direction towards the minor cutting edge.

7. The indexable cutting insert according to claim 5, wherein each pair of a main cutting edge and a minor cutting edge, which main cutting edge and minor cutting edge are connected by a cutting corner, when projected into a plane parallel to the top support surface include an angle in a range from 85° to 95°.

8. The indexable cutting insert according to claim 1, wherein each of the minor cutting edges is parallel to the top support surface.

9. The indexable cutting insert according to claim 1, wherein each of the main cutting edges have an identical total length, wherein each of the minor cutting edges have an identical total length, and wherein the total length of the main cutting edges is at least twice the total length of the minor cutting edges.

10. A shoulder milling tool comprising:
a tool body, which tool body includes a plurality of insert seats; and
a plurality of indexable cutting inserts according to claim 1 mounted on the insert seats.

* * * * *